United States Patent Office 3,579,502
Patented May 18, 1971

3,579,502
PROCESS FOR PREPARING TETRAHYDRO[2,1-d]-BENZO[f][1,4] - DIAZEPIN - 6(7H)- ONES AND INTERMEDIATES
Marcel Müller, Frenkendorf, and Paul Zeller, Allschwil, Switzerland, assignors to Hoffmann-La Roche Inc., Nutley, N.J.
No Drawing. Filed Jan. 16, 1967, Ser. No. 609,321
Claims priority, application Switzerland, Jan. 21, 1966, 855/66
Int. Cl. C07d 53/06
U.S. Cl. 260—239.3
4 Claims

ABSTRACT OF THE DISCLOSURE

In the instant case, there is disclosed various processes for preparing 5,9,10,14b-tetrahydroisoquino[2,1-d]-benzo[f][1,4]diazepin-6(7H)-ones(A). In one important process variation, a 1-(o-amino-phenyl)-3,4-dihydroisoquinoline(B) is reacted with a member capable of providing a halo-lower alkanoyl group such as halo lower alkanoyl halide to give a novel (2'-halo-lower alkanoyl-aminophenyl)(C) derivative. C is then ring closed to a novel 6-oxo - 6,7,9,10 tetrahydroisoquino[2,1-d]benzo[f][1,4]diazepin-(8)-ium(D). D is then reduced to A.

In another important process variation, B or a 1-(o-nitro-phenyl)-3,4-dihydroisoquinoline is treated with an α-substituted acetic acid derivative. The resulting product is reduced and ring closed at elevated temperatures to A.

Compounds A are useful for pharmaceutical purposes, e.g. as sedatives, as tranquilizers, as anti-convulsants and as muscle relaxants.

BRIEF SUMMARY OF THE INVENTION

The present invention, therefore, relates to a process for preparing compounds A and to novel intermediates which result when performing such processes.

DETAILED DESCRIPTION

The present invention in detail relates to a process for preparing compounds of the formula

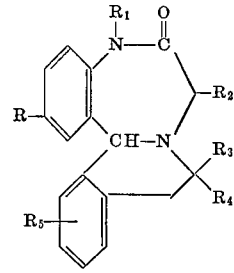

V wherein R is selected from the group consisting of hydrogen, halogen, nitro, trifluoromethyl and amino; $R_1$ is selected from the group consisting of hydrogen, lower alkyl, lower alkenyl, $C_3$–$C_6$ cycloalkyl-loweralkyl, lower alkyl-amino-lower alkyl and di-lower alkyl-amino-lower alkyl; $R_2$ is selected from the group consisting of hydrogen, lower alkyl and lower alkyloxy carbonyl; $R_3$ and $R_4$ are each selected from the group consisting of hydrogen and alkyl; and $R_5$ is selected from the group consisting of hydrogen and halogen and acid addition salts of compounds of the Formula V above with pharmaceutically acceptable acids.

The processes involved herein may be illustrated diagrammatically generally as follows:

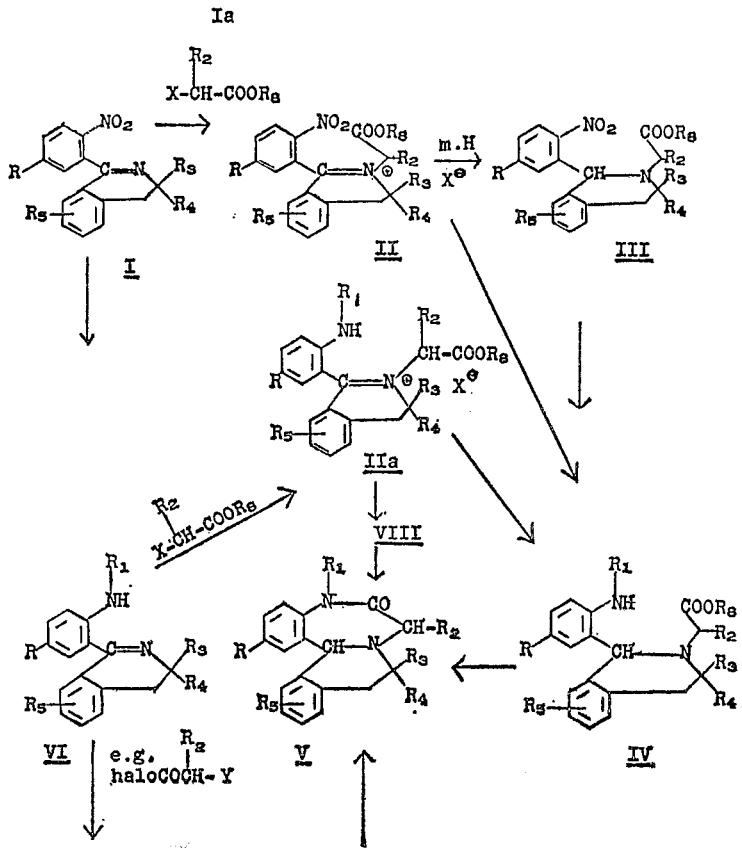

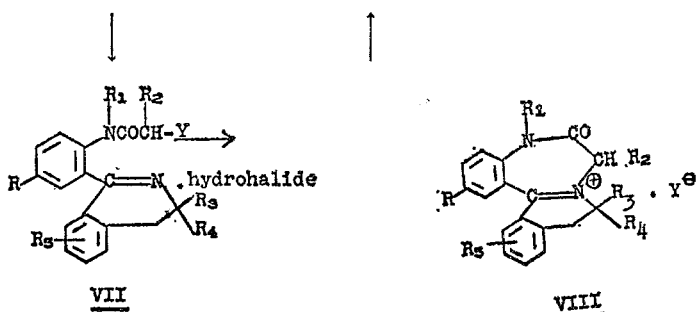

VII    VIII

In the formulae found in the diagrammatical flowsheet illustrated above, R, $R_1$, $R_2$, $R_3$, $R_4$ and $R_5$ have the same significance as ascribed thereto hereinabove; $R_8$ is selected from the group consisting of hydrogen and lower alkyl and X and Y are each selected from suitable leaving groups, e.g. halogen, preferentially, chlorine and bromine, alkylsulfonyloxy, e.g. mesyloxy and arylsulfonyloxy, e.g. tosyloxy.

The term "lower alkyl" is used throughout this specification, either alone or in combination with another radical is intended to designate a $C_1$–$C_7$ saturated hydrocarbon group such as methyl, ethyl, isopropyl, butyl, tertiary butyl and the like.

The term "lower alkenyl" connotes a $C_2$–$C_7$ olefinic hydrocarbon group such as vinyl, propenyl, 2-methylpropenyl and the like.

The term "$C_3$–$C_7$ cycloalkyl-lower alkyl" connotes a cyclopropyl-lower alkyl group, a cyclobutyl-lower alkyl group; a cyclopentyl-lower alkyl group or a cyclohexyl-lower alkyl group such as cyclopropyl methyl and the like. The expression "lower alkyl-amino-lower alkyl" connotes a secondary amino radical such as mono-methyl amino ethyl and the like. Similarly, the expression "di-lower alkyl-amino-lower alkyl" connotes a grouping such as di-methyl-amino-ethyl and the like.

The term "acyloxy" as employed herein is intended to represent, for example, the acyl moiety of a lower alkanoic acid such as acetoxy, propionoxy and the like. The term "lower alkyloxy carbonyl" connotes a grouping such as methoxycarbonyl, ethoxycarbonyl and the like. By the term "halogen" as employed herein, unless otherwise specified, there is intended all four forms thereof, i.e. chlorine, fluorine, bromine and iodine.

When R is halogen, preferred is chlorine, fluorine and bromine. When $R_5$ is halogen, preferred is fluorine. In a more preferred embodiment, $R_3$, $R_4$ and $R_5$ are all hydrogen. In the most preferred embodiment, in any of the formulas found in the above diagrammatical flow sheet, $R_3$, $R_4$ and $R_5$ are all hydrogen, $R_1$ is selected from the group consisting of hydrogen, lower alkyl and cycloalkyl-lower alkyl and $R_2$ is selected from the group consisting of hydrogen and lower alkoxy carbonyl. Furthermore, compounds in which R in the formulae above connotes a fluorine, bromine, amino or a nitro group constitute an especially preferred embodiment.

As is noted above, the compounds of the Formula V above form acid addition salts with pharmaceutically acceptable acids. Among the acids suitable for the salt-forming purpose are inorganic acids, such as hydrochloric acid, hydrobromic acid, nitric acid and sulphuric acid and organic acids such as sulfo acids, e.g. benzene sulfonic acid, toluene sulfonic acid and the like and carboxylic acids such as oxalic, tartaric acid, citric acid and the like. Also included within the purview of the present invention are quaternary salts of the compound of the Formula V above which are obtained by alkylation of the isoquinoline nitrogen atom thereof.

In the reaction leading from a compound of the Formula I to the corresponding compound of the Formula II, a compound of the Formula I above is reacted with an α-substituted lower alkanoic acid e.g. an α-halo-lower alkanoic acid, an α-lower-alkyl sulfonoxy-lower-alkanoic acid on α-aryl (tolyl) sulfonoxy-lower-alkanoic acid or a derivative thereof of the Formula Ia. Selectively or concurrently, depending upon the reaction conditions employed, the nitro group or the C=N grouping of the so-obtained compound of the Formula II above can be reduced. In one embodiment, a compound of the Formula III is obtained by selective reduction of the C=N group. By subsequently reducing the nitro group, a compound of the Formula IV is prepared. Alternatively, a compound of the Formula II can be directly converted into a compound of the Formula IV. The compound of the Formula IV obtained by either procedure is then cyclized to the corresponding compound of the Formula V above by heating the compound of the Formula IV above, either per se or in the presence of an inert organic solvent.

In the reaction route from I→II, the compound of the Formula I above is alkylated at the isoquinoline nitrogen atom thereof to the corresponding compound of the Formula II above. As is noted above, this alkylation is effected e.g. with an α-X-lower alkanoic acid wherein X is preferentially chlorine or bromine or a derivative thereof of the Formula Ia above. Suitably, an α-X-lower alkanoic acid lower alkyl ester, e.g. α-bromacetic acid lower alkyl ester or α-chloracetic acid lower alkyl ester and an α-X-α-lower alkoxy carbonyl lower alkanoic acid lower alkyl ester such as α-halo-ethylmalonate are utilized. An especially preferred substituent in the α-position of the lower alkanoic acid derivative utilized to effect alkylation of the compounds of the Formula I above are lower alkyl-oxy-carbonyl groups such as methoxy carbonyl, ethoxy carbonyl and the like. The alkylation, i.e. the conversion of the compound of the Formula I to the corresponding compound of the Formula II above, is conveniently carried out by heating the lower alkanoic acid which is substituted in the α-position as described above, with a compound of the Formula I above in the presence of an inert organic solvent. Preferred inert organic solvents are, for example, lower alkanols, such as methanol and ethanol, ketones such as acetones or diethyl ketone, or strongly polar inert organic solvents (such as, for example, dimethylformamide).

In performing the above reaction with heat, it is, of course to be understood that temperatures which cause decomposition of any of the starting materials employed or of the end product prepared or evaporation of the solvent medium utilized should not be employed. The resulting compound of the Formula II above is reduced in the manner more fully described herein. After such reduction has been effected, there are obtained compounds of the Formula IV above which can be cyclized by heating same at from about 150° to about 300° C., preferably at about 200° C. In a preferred embodiment, the cyclization is carried out in the absence of a solvent. However, in a less preferred variation, the ring closure can be effected by heating the compound of the Formula IV in the presence of an inert organic solvent such as, for example, an aromatic hydrocarbon, e.g. xylene, naphthalene and the like or an ether such as diethylene glycol, diethyl ether and the like.

Any of the compounds found in the diagrammatical flow sheet above wherein R is hydrogen can be halogenated or nitrated. For example, a compound of the Formula V above, can be nitrated by treating the same with a mixture of concentrated sulfuric acid and concentrated nitric acid. In this procedure, the sulfuric acid can serve as the solvent medium. Thus, the concentrated sulfuric acid can conveniently serve a two-fold purpose, i.e. both as participant in the nitration step and further as a solvent for the reaction. Furthermore, halogenation of the compounds of the Formula II above or of the compounds of the Formula V above or of the Formula VIII above wherein R is hydrogen to the corresponding compound wherein R is halogen is effected with halogen in the presence of an inert solvent such as, for example, glacial acetic acid, chloroform or carbon tetrachloride and a Lewis acid which contains a halogen moiety corresponding to the entering halogen group. For example, when bromine is the entering halogen atom, the Lewis acid utilized is hydrobromic acid or aluminum tribromide.

The nitrated compounds which contains a single nitro group at R can be reduced by the techniques specified herein, e.g. hydrogenation in the presence of Raney nickel or a noble metal catalyst to form the corresponding compound wherein R is amino. The resulting compound wherein R is amino if desired, can be converted into the corresponding compound wherein R is halogen by treatment of the latter with nitrous acid in the presence of a mineral acid, e.g. hydrochloric acid, followed by treatment of the resulting substance with a strong hydrohalic, e.g. a hydrochloric acid in the presence of cuprous chloride whereby to obtain the corresponding compounds wherein R is a halogen.

Compounds which contain an amino functional group, e.g. compounds of the Formula IIa and VI above, can be acylated at the amino nitrogen function thereof with any suitable acylating agent such as acetic anhydride. This acylation has been found to be necessary when it is desired to introduce by nitration or halogenation, a halogen or a nitro substituent into the 5′-position of the phenyl ring of a 3,4-dihydro ir a tetrahydroisoquinoline which is prepared by the procedure found in the diagramamtical flow sheet set out above. The acyl group can be removed conventionally by treating with ethanolic hydrochloric acid.

The nitro group of the compound of the Formula I or of the Formula II above or of the Formula III above contained in the ortho position of the phenyl group, can be reduced by hydrogenation employing a hydrogenation catalyst such as Raney nickel or a noble metal. Preferred noble metal catalysts are palladium and platinum. This procedure will also result in the reduction of a C=N grouping, if present. However, if selective reduction of a C=N grouping is desired without a corresponding reduction of a nitro group, if present, metal hydrides such as, for example, alkali metal borohydrides can be employed for this purpose. An especially preferred metal hydride suitable for the selective reduction of the C=N grouping of any of the compounds illustrated above is sodium borohydride. The reduction with sodium borohydride is particularly efficacious in the situation where the isoquinoline nitrogen is present in the molecule in a quaternized form, e.g. a compound of the Formula II above. Thus, one proceeds from II→III utilizing a metal hydride and from III→IV utilizing, for example, catalytic hydrogenation.

If selective reduction of the $NO_2$ group is desired, iron particles in glacial acetic acid can be utilized as the reducing system. In ths way, the nitro grouping will be reduced without a C=N grouping, if present, being effected. A similar result can be achieved if there is used other prior art procedures for obtaining the same end, e.g. zinc in hydrochloric acid.

In another reaction route leading to the compounds of the Formula V above, a compound of the Formula VI above is reacted with a compound capable of providing the grouping

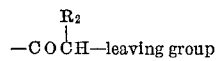

in the presence of a base, e.g. an alkali hydroxide, for example, sodium hydroxide or an alkali alcoholate such as sodium methoxide. Representative of such

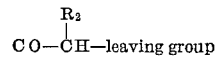

providing agents suitable for the conversion of the compound of the Formula VI above to the corresponding compound of the Formula VII above are α-substituted lower akanoyl halides such as chloracetylchloride, α-bromo-α-ethoxycarbonyl-acetyl bromide or tosyloxy acetyl chloride or an acid anhydride such as α-bromo acetic anhydride, α-chloropropionic acid anhydride or esters such as bromo acetic acid ethyl ester or α-chloro-propionic acid methyl ester. By a leaving group, there is intended a group which can be easily removed whereby to permit cyclization to the desired compound of the Formula VIII. Representative of such are halogen groups, e.g. chlorine or bromine, lower alkyl-sulfonyloxy groups such as mesyloxy or arylsulfonyloxy groups, e.g. benzenesulfonyloxy or tosyloxy.

The resulting compound of the Formula VII above can be cyclized to the compound of the Formula VIII with or without isolation from the reaction medium in which it is prepared. The ring closure of the compound of the Formula VII above to the corresponding compound of the Formula VIII above is conveniently carried out by neutralizing a compound of the Formula VII above, and then, in one embodiment, heating the so-neutralized compound in the absence of the solvent. In another embodiment, the cyclization of the neutralized compound is effected in the presence of an inert organic solvent. Preferred inert organic solvents suitable for this purpose of the present invention are, for example, lower alkanols, such as methanol, ethanol and the like, ketones such as acetone, diethylketone and the like or strongly polar inert organic solvents such as, for example dimethylformamide and the like.

In a preferred embodiment the compound of the Formula VI above is reacted with a compound of the formula

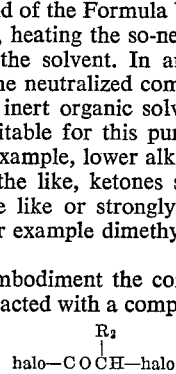

to obtain the corresponding compound of the Formula VII above and without isolation of the resulting compound of the Formula VII above, the ring closure to the corresponding compound of the Formula VIII above is effected. The compound of the Formula VIII above is then reduced with a metal hydride, e.g. sodium borohydride, at the C=N grouping thereof into the corresponding compoun of the Formula V.

Compounds of the Formula VIII above and compounds of the Formula V above have 1 or more centers of asymmetry and can correspondingly be split into their optical antipodes or diastereomers by conventional procedures.

A compound of the Formula I above can be prepared as follows:

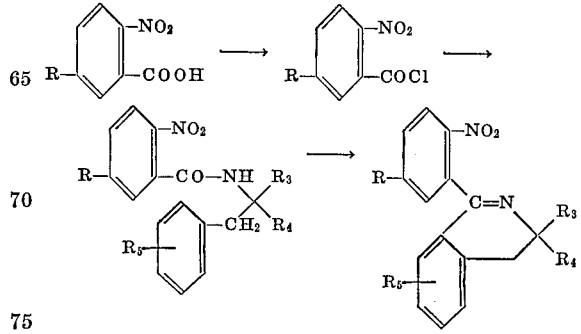

In these formulae, $R_1$, $R_3$, $R_4$ and $R_5$ have the same meanings as ascribed thereto hereinabove.

Reaction of the ortho nitro benzoic acid derivative wherein R has the same meaning as is given above with, for example, thionyl chloride or phosphorus pentachloride gives the corresponding acid chloride. The so-prepared acid chloride, upon reaction with a suitable amine, is converted into the acid amide from which the desired compound of the Formula I above can be prepared, as indicated in the diagrammatical flow sheet above.

In an alternate process variation, the starting material of the Formula I above can be hydrogenated as follows:

Reaction scheme

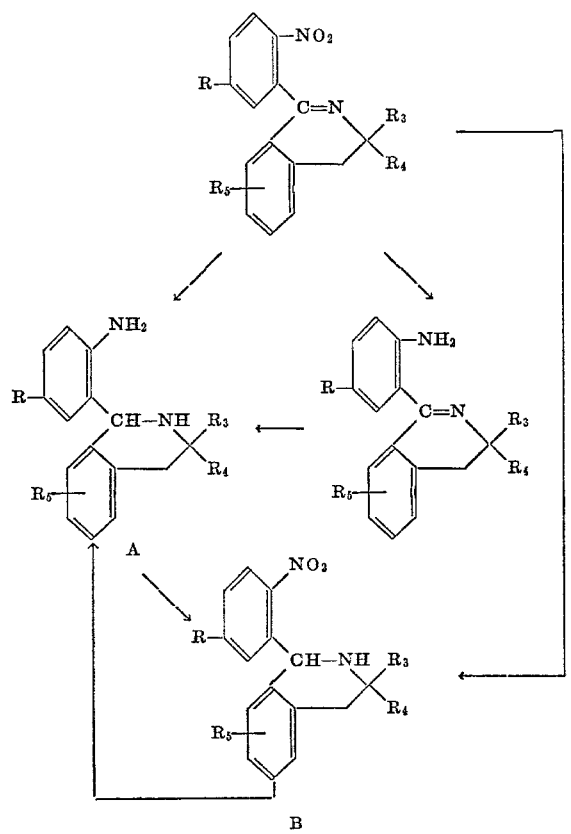

The so-obtained compounds of the Formulae A and B above can be treated according to the techniques described above whereby to obtain a compound of the Formula V.

Compounds in any of the formula illustrated above wherein $R_1$ is hydrogen can be converted into a corresponding compound wherein $R_1$ is other than hydrogen by a variety of methods. For example, the open chain compounds, i.e. compounds of the Formulae IV and VI above, can be converted into the corresponding compounds wherein $R_1$ is alkyl, alkenyl or an amino alkyl group by first tosylating or acylating the open chain compounds whereby to provide, for example, a tosyl amino or an acetyl amino containing compound. The so-cobtained compounds are converted into the sodio derivatives thereof with an alkali hydride, e.g. sodium hydride. The sodio derivative is then treated with the appropriate reagent to give the corresponding compound wherein $R_1$ is other than hydrogen. With an alkyl halide, e.g. methyl iodide, a lower alkyl group can be obtained. If a lower alkenyl group is desired, allyl bromide can be employed. If a mono-lower alkyl amino-lower alkyl group or a di-lower alkyl amino-lower alkyl group is desired, a compound of the formula

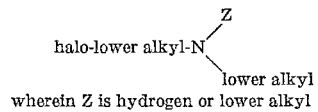

wherein Z is hydrogen or lower alkyl can be reacted with the sodio derivative of the tosylated open compound to effect this end. Similarly, a cycloalkyl-lower alkyl compound can be prepared. The resulting tosyl containing compounds are then detosylated or the acyl containing compounds are then deacylated according to conventional procedures whereby to obtain the appropriate compound wherein $R_1$ has the desired meaning.

Compounds of the Formulae V and VIII above (the ring-closed compounds) wherein $R_1$ is hydrogen, can in the same manner as described above, be converted into the corresponding compounds wherein $R_1$ is other than hydrogen. However, when providing the grouping $R_1$ which is other than hydrogen on the ring-closed compounds, the tosylating or acylating step is not required.

The products prepared by the processes described above and hereinafter, are sedatives, tranquilizers, anti-convulsants and muscle relaxants. They find use for pharmaceutical purposes for enteral and parenteral application in pharmaceutical preparations. Such preparations can be prepared by mixing the appropriate compound of the Formula V above with a pharmaceutical organic or inorganic inert carrier material, such as water, gelatin, lactose, starch, magnesium stearate, talc, vegetable oil, gums, polyalkylene glycols, vasoline and the like. The pharmaceutical dosage forms can be provided in solid forms, e.g. as tablets, dragees, suppositories, capsules and the like or in liquid form (such as solutions, suspensions or emulsions). They may be sterilized and/or contain additives such as preserving stabilizing wetting or emulsifying agents, salts for varying the osmotic pressure or buffers. They also can contain other therapeutically useful substances.

The following examples are illustrative but not limitative of the present invention. All temperatures are stated in degrees centigrade.

EXAMPLE 1

To 24.9 g. of 1-(o-nitrophenyl)-3,4-dihydroisoquinoline dissolved in 100 ml. of acetone, there is added 14 ml. of bromoacetic acid ethyl ester. The mixture is heated at 30° for 3 hours. After standing overnight, 500 ml. of ether are added thereto and the precipitate which forms is removed by filtration. The so-obtained precipitate is washed with ether and dissolved in 300 ml. of water. With cooling to 15°, 5.0 g. of sodium borohydride are then added to the solution. The resultant mixture is stirred for 15 minutes, whereby an oil separates out. The mixture is extracted with ether, washed neutral with water, the ether extract dried with sodium sulfate and the ether removed by evaporation in vacuum. The residue is dissolved in 250 ml. of alcohol and hydrogenated in the presence of 2 g. of Raney nickel (hydrogen uptake: 3200 ml.). The catalyst is filtered off and the filtrate evaporated to dryness. The so-obtained residue is heated at 200° under nitrogen for 1.5 hours. The reaction mixture is cooled and triturated up to crystallization with a little benzene. The crystals are filtered off and boiled up with 70 ml. of alcohol. After cooling and filtration, there is obtained 5,9,10,14b - tetrahydroisoquino[2,1 - d]benzo-[f][1,4]diazepin-6(7H)-one which melts at 247–248°.

The same product is obtained by utilizing in the above procedure tosyloxy acetic acid ethyl ester in place of bromoacetic acid ethyl ester.

EXAMPLE 2

2.2 g. of 1-(o-aminophenyl)-3,4-dihydroisoquinoline are dissolved in 80 ml. of absolute ether. The resulting solution is then cooled to −10°. To the so-cooled solution, there is added dropwise a mixture of 2.2 g. of bromoacetyl bromide in 20 ml. of ether. The resultant medium is stirred at −10° for 15 minutes, poured onto ice water, adjusted to pH 8 with dilute caustic soda and the reaction mixture subsequently extracted with ether. The ether extract is washed neutral with water, dried with sodium sulfate and the ether subsequently distilled off in vacuum giving 6,7,9,10-tetrahydro - 6 - oxo-5H-isoquino[2,1-d]benzo[f][1,4]diazepin-8-ium bromide in the form of yellow crystals. After recrystallization from a mixture of alcohol and ether, the product melts at 272–273° (decomposition).

EXAMPLE 3

In the manner described in Example 2, 1-(o-aminophenyl)-3,4-dihydroisoquinoline is reacted with chloroacetyl chloride to give 6,7,9,10-tetrahydro-6-oxo-5H-isoquino[2,1-d]benzo[f][1,4]diazepin-8-ium chloride which melts at 254–255°.

EXAMPLE 4

1.0 g. of 6,7,9,10-tetrahydro-6-oxo-5H-isoquino[2,1-d]benzo[f][1,4]diazepin-8-ium bromide is dissolved in 30 ml. of methanol. A solution of 0.5 g. of sodium borohydride in 5 ml. of water is added thereto. The so-obtained mixture is allowed to stand for 10 minutes. The reaction mixture is diluted with ice water, the precipitate which is deposited is filtered off and the product is recrystallized from alcohol yielding 5,9,10,14b-tetrahydroisoquino[2,1-d]benzo[f][1,4]diazepin-6(7H)-one which melts at 247–248°.

EXAMPLE 5

5.3 g. of 1-(o-acetylaminophenyl)-3,4-dihydroisoquinoline are dissolved in 30 ml. of concentrated sulfuric acid and the mixture cooled to 0°. A mixture of 0.9 ml. of fuming nitric acid and 1.5 ml. of concentrated sulfuric acid is slowly added dropwise thereto. The resulting medium is restirred for 1 hour at −5° to 0° and thereafter poured into a mixture of ice, ammonium hydroxide-water. There is deposited a white precipitate which is filtered off and after recrystallization from acetone gives crystalline 1-(2'-acetylamino-5'-nitrophenyl) - 3,4 - dihydroisoquinoline which melts at 204–205°.

EXAMPLE 6

To 1.0 g. of 1-(2'-acetylamino-5'-nitrophenyl)-3,4-dihydroisoquinoline dissolved in 5 ml. of ethanol, there is added 5 ml. of concentrated hydrochloric acid. The so-obtained mixture is heated to 100° for 2 hours. It is then cooled, made basic with ammonia/water and the precipitate which is deposited is separated by filtration. The precipitate is then dissolved in ether and treated with active charcoal. After filtering off the active charcoal, petroleum ether is added to the filtrate and on standing there crystallizes 1-(2'-amino-5'-nitrophenyl) - 3,4 - dihydroisoquinoline in the form of yellow crystals which melt at 127–128°.

EXAMPLE 7

A solution of 0.85 g. of bromoacetyl bromide in 10 ml. of ether is added dropwise to a solution of 1.0 g. of 1-(2'-amino-5'-nitrophenyl)-3,4-dihydroisoquinoline in 30 ml. of ether and 5 ml. of dimethoxyethane which is cooled to −10°. The resulting mixture is thereafter stirred for 30 minutes at −10°. There is deposited a precipitate which is filtered off. The precipitate is recrystallized from a mixture of methanol and ethanol, giving 1-(2'-bromoacetylamino - 5' - nitrophenyl) - 3,4 - dihydroisoquinoline hydrobromide which melts at 192–194°.

In a similar manner as described above but utilizing instead of bromoacetyl bromide, mesyloxyacetyl, chloride, there is obtained 1-(2'-mesyloxyacetylamino-5'-nitrophenyl)-3,4-dihydroisoquinoline hydrochloride.

EXAMPLE 8

1.0 g. of 1-(2'-bromoacetylamino-5'-nitrophenyl)-3,4-dihydroisoquinoline hydrobromide is dissolved in 20 ml. of ethanol and heated at reflux for 30 minutes. The solvent is distilled off in vacuum and the residue recrystallized from a mixture of methanol and ethanol giving 2 - nitro - 6,7,9,10 - tetrahydro-6-oxo-5H-isoquino[2,1-d]benzo[f][1,4]diazepin-8-ium bromide which melts at 305° to 308°.

EXAMPLE 9

A solution of 0.5 g. of sodium borohydride in 5 ml. of water is added to a solution of 1.0 g. of 2-nitro-6,7,9,10-tetrahydro - 6 - oxo - 5H - isoquino[2,1-d]benzo[f][1,4] diazepin-8-ium bromide in 30 ml. of methanol. The resulting mixture is restirred for 10 minutes and then poured onto ice water. The precipitate which is deposited is filtered off and immediately dissolved in 2 N hydrochloric acid. On standing, there separate out colorless crystals. Upon recrystallization of the colorless crystals from methanol, 2 - nitro-5,9,10,14b-tetrahydroisoquino[2,1-d]benzo[f][1,4]diazepin-6(7H)-one hydrochloride which melts at 244–246°, is obtained.

EXAMPLE 10

A mixture of 0.9 ml. of concentrated nitric acid and 1.2 ml. of concentrated sulfuric acid is added dropwise with stirring to a solution of 5.3 g. of 5,9,10,14b-tetrahydroisoquino[2,1-d]benzo[f][1,4]diazepin - 6(7H) - one in 35 ml. of concentrated sulfuric acid which is cooled to 0°. The reaction mixture is held at 0° for 15 hours, then poured onto ice water and adjusted to pH 8 with ammonium hydroxide. The precipitate which is deposited is filtered off and chromatographed on 100 g. of aluminum oxide (activity II). The fractions which are uniform according to thin layer chromatography are combined and treated with hydrochloric acid in the manner described in Example 9. The product isolated is found to be identical in all properties with the 2-nitro-5,9,10,14b-tetrahydroisoquino[2,1-d]benzo[f][1,4]diazepin - 6(7H)-one hydrochloride prepared as described in Example 9.

EXAMPLE 11

2.10 g. of sodium methylate are added to a solution of 10.0 g. of 5,9,10,14b-tetrahydroisoquino[2,1-d]benzo[f][1,4]diazepin-6(7H)-one in 260 ml. of dimethylformamide. 2.7 ml. of methyl iodide are subsequently added and the mixture stirred at room temperature overnight. The mixture is then poured onto ice water and extracted with methylene chloride. The organic extracts are washed with water, dried with sodium sulfate and the solvent distilled off in vacuum. The residue is chromatographed on silica gel. The methylene chloride/ether (92:8) eluates yield pure, amorphous 5-methyl-5,9,10,14b-tetrahydroisoquino[2,1-d]benzo[f][1,4]diazepin-6(7H)-one.

The product thus obtained is dissolved in alcohol and by passing in HCl gas converted into the hydrochloride which, after the addition of ether, crystallizes out in colorless prisms. Melting point: 260–262°.

EXAMPLE 12

A tablet dosage form containing the following ingredients:

| | Per tablet, mg. |
|---|---|
| 2-nitro - 5,9,10,14b-tetrahydroisoquino[2,1-d]benzo[f][1,4]diazepin-6(7H)-one hydrochloride | 25 |
| Lactose | 98 |
| Maize starch | 40 |
| Prehydrolyzed maize starch | 10 |
| Calcium stearate | 2 |
| Total weight | 175 | are prepared as follows:

The 2-nitro-5,9,10,14b-tetrahydroisoquino[2,1-d]benzo[f][1,4]diazepin-6(7H)-one, the lactose, the maize starch and the prehydrolyzed maize starch are mixed in a suitable mixer and granulated with water to a thick paste. The moist mass is pressed through a sieve and dried at 45° for 16 hours. The dry granulate is passed through a sieve and then placed in a suitable mixing apparatus. The calcium stearate is then added to the resultant mixture and the so-obtained mixture is thoroughly blended. Tablets having a weight of 175 mg. and a diameter of 8 mm. are then pressed. The tablets can either be flat or biconvex and can exhibit a groove for breaking.

EXAMPLE 13

A capsule dosage form containing the following ingredients:

| | Per capsule, mg. |
|---|---|
| 2-nitro - 5,9,10,14b-tetrahydroisoquino[2,1-d]benzo[f][1,4]diazepin-6(7H)-one hydrochloride | 25 |
| Lactose | 155 |
| Maize starch | 30 |
| Talc | 5 |
| Total net weight | 215 | is prepared as follows:

2 - nitro - 5,9,10,14b - tetrahydroisoquino[2,1-d]benzo[f][1,4]diazepin-6(7H)-one hydrochloride, the lactose, the maize starch and the talc are thoroughly blended. The powder obtained is filled into suitable two-part hard gelatin capsules on a usual capsule-filling machine.

EXAMPLE 14

A parenteral dosage form containing the following ingredients:

| | Per ml. |
|---|---|
| 2 - nitro-5,9,10,14b-tetrahydroisoquino[2,1-d]benzo[f][1,4]diazepin-6(7H)-one hydrochloride, mg. | 2.02 |
| N,N-dimethylacetamide, mg. | 0.1 |
| Propylene glycol, ml. | 0.5 |
| Water for injection, q.s. ad., ml. | 1.0 | is prepared as follows:

2 - nitro-5,9,10,14b-tetrahydroisoquino[2,1-d]benzo[f][1,4]diazepin-6(7H -one hydrochloride is dissolved in the N,N-dimethylformamide and treated with the propylene glycol. The solution obtained is blended and brought to the desired volume with the water for injection. The solution is filtered over a candle filter and then filled into brown 2 ml. ampules under a nitrogen atmosphere. The ampules are sterilized for 30 minutes at 0.07 atmospheres and then inspected for suspended material, faults in the glass, etc.

EXAMPLE 15

To a solution of 8.5 g. of 1-(2'-methylamino-5'-nitrophenyl)-3,4-dihydroisoquinoline in 90 ml. of diethylene glycol dimethyl ether, there is added while maintaining the temperature at 10°, 7.3 g. of bromoacetyl bromide in 20 ml. of diethylene glycol dimethyl ether. The resulting medium is stirred in 150 ml. of ethanol for ½ hour. Thereafter, it is refluxed for ½ hour. After cooling the so-formed reaction mixture to at about the beginning of crystallization, ether is added giving 2-nitro-5-methyl-6,7,9,10 - tetrahydro-6-oxo-5H-isoquino[2,1-d]benzo[f][1,4] diazepin-8-ium bromide of melting point 232°.

4.7 g. of this compound is added to a mixture containing 90 ml. of water and 180 ml. of methanol. To the resulting medium, there is added 2.4 g. of sodium borohydride. The crystalline material which formed is separated and recrystallized from methanol giving 2-nitro-5-methyl-5,9,10,14b - tetrahydroisoquino[2,1-d]benzo[f][diazepin-6(7H)-one, melting point 207–208°. By treating the methanolic solution of the base with HCl gas, the hydrochloride of melting point 259–260° is obtained.

The starting material 1-(2'-methylamino-5'-nitrophenyl)-3,4-dihydroisoquinoline is prepared as follows:

To a solution of 7.5 g. of sodium hydride in 200 ml. of dimethylformamide, there is carefully added a solution of 30.0 g. of 1-(o-acetylaminophenyl)-3,4-dihydroisoquinoline in 200 ml. of dimethylformamide. To the so-formed mixture, there is carefully added with stirring 9 ml. of methyl iodide in 20 ml. of dimethylformamide. After stirring at room temperature for 90 minutes, the resulting medium is poured onto ice water and extracted with methylene chloride. The methylene chloride extract is washed neutral with water, dried over sodium sulfate and evaporated under reduced pressure giving 1-[o-(N-acetyl - N-methylamino)phenyl]-3,4-dihydroisoquinoline is an oil. The oil so-obtained is added at 0° to 180 ml. of concentrated sulfuric acid and over a period of 5 minutes, there is added to the resulting medium, a mixture containing 6.3 ml. of fuming nitric acid and 11 ml. of concentrated sulfuric acid. After stirring for 1 hour, the medium is poured onto ice water. It is then extracted with methylene chloride. After recrystallization from acetone, there is obtained 1 - [2' - (N-acetyl-N-methylamino)-5'-nitrophenyl]-3,4-dihydroisoquinoline which melts at 176–177°.

15 g. of 1-[2'-(N-acetyl-N-methylamino)-5'-nitrophenyl]-3,4-dihydroisoquinoline in 75 ml. of ethanol and 75 ml. of concentrated hydrochloric acid is heated at 100° for 3 hours. The reaction mixture is cooled to room temperature, neutralized with aqueous ammonia to a pH of 9 and poured onto ice water. The resulting medium is then extracted with methylene chloride. The methylene chloride extract is washed neutral with water, dried with sodium sulfate and evaporated under reduced pressure. After crystallization from methylene chloride/ether, 1-(2'-methylamino - 5' - nitrophenyl)-3,4-dihydroisoquinoline, melting point 124–125°, is obtained.

What is claimed is:

1. A compound of the formula

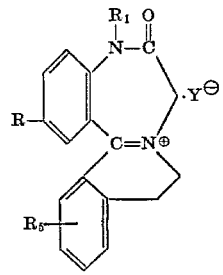

wherein R is selected from the group consisting of hydrogen, halogen, nitro, trifluoromethyl and amino; $R_1$ is selected from the group consisting of hydrogen and lower alkyl; $R_5$ is selected from the group consisting of hydrogen and halogen; and $Y^\ominus$ is a halogen anion leaving group.

2. A compound as defined in claim 1 of the formula 2 - nitro - 6,7,9,10 - tetrahydro-6-oxo-5H-isoquino[2,1-d]benzo[f][1,4]diazepin-8-ium halide.

3. A compound as defined in claim 1 of the formula 6,7,9,10 - tetrahydro - 6 - oxo-5H-isoquino[2,1-d]benzo[f][1,4]diazepin-8-ium halide.

4. A process for preparing a compound of the formula

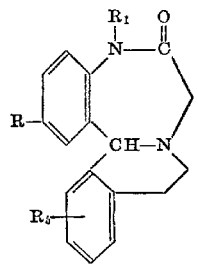

I wherein R is selected from the group consisting of hydrogen, halogen, nitro, trifluoromethyl and amino; $R_1$ is selected from the group consisting of hydrogen and lower alkyl; $R_5$ is selected from the group consisting of hydrogen and halogen which comprises (a) treating a compound of the formula

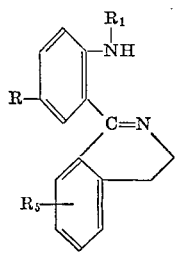

II wherein Y is a halogen leaving group whereby to obtain a compound of the formula

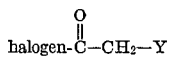

wherein Y is a halogen leaving group whereby to obtain a compound of the formula

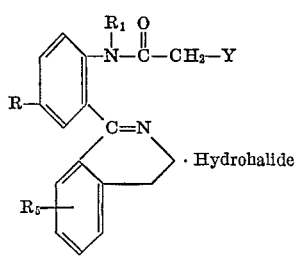

III wherein R, $R_1$, $R_5$ and Y are as described above (b) neutralizing the compound of the Formula III above and then, with heat, ring closing the so neutralized compound to a compound of the formula

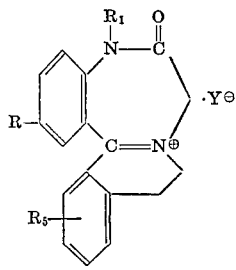

IV wherein R, $R_1$, $R_5$ and Y are as described above; and (c) reducing the so obtained compound of Formula IV with a metal hydride to the corresponding compound of Formula I.

References Cited

UNITED STATES PATENTS 3,420,818  1/1969  Ott ——————————— 260—239.3

FOREIGN PATENTS

65/4606  2/1966  South Africa ——————— 260—239.3

HENRY R. JILES, Primary Examiner

R. T. BOND, Assistant Examiner

U.S. Cl. X.R.

260—287, 288, 283; 424—258

PO-1050
(5/69)

UNITED STATES PATENT OFFICE
CERTIFICATE OF CORRECTION

Patent No. 3,579,502            Dated May 18, 1971

Inventor(s) Muller and Zeller

It is certified that error appears in the above-identified patent and that said Letters Patent are hereby corrected as shown below:

Column 13, lines 14 and 15 in claim 4

"wherein Y is a halogen leaving group whereby to obtain a compound of the formula"

should be wherein R, $R_1$ and $R_5$ are as described above with a compound of the formula Signed and sealed this 11th day of January 1972.

(SEAL)
Attest:

EDWARD M. FLETCHER, JR.          ROBERT GOTTSCHALK
Attesting Officer                 Acting Commissioner of Patents